United States Patent
Kelly

(10) Patent No.: US 12,441,487 B1
(45) Date of Patent: Oct. 14, 2025

(54) HYDRAULIC OVER ELASTIC SEPARATION MECHANISM

(71) Applicant: United Launch Alliance, L.L.C., Centennial, CO (US)

(72) Inventor: Christopher Sheridan Kelly, Colorado Springs, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 302 days.

(21) Appl. No.: 18/133,274

(22) Filed: Apr. 11, 2023

(51) Int. Cl.
*G01N 3/36* (2006.01)
*B64F 5/60* (2017.01)
*G01L 5/00* (2006.01)
*G01N 3/14* (2006.01)
*G01N 3/307* (2006.01)

(52) U.S. Cl.
CPC ............... *B64F 5/60* (2017.01); *G01L 5/00* (2013.01)

(58) Field of Classification Search
CPC .............. G01N 2203/0262; G01N 2203/0252; G01N 2203/0035; G01N 2203/0019; G01N 2203/0017; G01N 2203/0042; G01N 2203/0048; G01N 3/10; G01N 3/064; G01N 2291/0231; G01N 223/615
See application file for complete search history.

(56) References Cited

U.S. PATENT DOCUMENTS

| | | | | |
|---|---|---|---|---|
| 3,994,158 A * | 11/1976 | Weinhold | ................ | G01N 3/10 73/837 |
| 4,430,884 A * | 2/1984 | Landrigan | ............ | G01L 27/007 73/37 |
| 5,005,424 A | 4/1991 | Markowski | | |
| 5,277,055 A * | 1/1994 | Pittard | ................ | G01M 99/007 73/11.01 |
| 5,437,191 A * | 8/1995 | Dripke | .................... | G01N 3/10 73/816 |
| 5,948,994 A | 9/1999 | Jen et al. | | |
| 6,370,962 B1 * | 4/2002 | Sullivan | .................. | G01N 3/08 73/833 |
| 6,526,837 B1 * | 3/2003 | Grote | .................... | G01N 3/062 73/856 |
| 6,880,385 B2 * | 4/2005 | Esser | ...................... | G01N 3/08 73/826 |
| 7,513,168 B2 * | 4/2009 | Alba | ....................... | G01N 3/16 73/818 |

(Continued)

FOREIGN PATENT DOCUMENTS

| | | |
|---|---|---|
| CN | 112284221 | 1/2021 |
| KR | 20-0359850 | 8/2004 |

OTHER PUBLICATIONS

"High Force Electric Universal Test Machines in 2021," TestResources, 2021, 12 pages [retrieved online Sep. 23, 2021 from: www.testresources.net/test-machines/universal-testing-machines/300-series-universal-test-machine].

*Primary Examiner* — Tran M. Tran
(74) *Attorney, Agent, or Firm* — Sheridan Ross P.C.

(57) ABSTRACT

A system and method for testing the decoupling of fluid fittings utilizing a hydraulic circuit in combination with a biasing mechanism to emulate the separation forces experienced by such couplings is disclosed. The biasing mechanism is loaded with a predetermined force and the flow of hydraulic fluid within the hydraulic circuit is controlled to follow desired separation force profiles.

24 Claims, 11 Drawing Sheets

(56) References Cited

U.S. PATENT DOCUMENTS

| | | | |
|---|---|---|---|
| 7,617,759 B2* | 11/2009 | Bachman | B66C 13/04 |
| | | | 91/1 |
| 8,006,568 B2* | 8/2011 | Halderman | G01N 3/04 |
| | | | 73/818 |
| 8,291,772 B2* | 10/2012 | Lopez, III | G01N 3/24 |
| | | | 73/845 |
| 8,596,058 B2 | 12/2013 | Matsumoto et al. | |
| 8,931,349 B2* | 1/2015 | Schwenke | G01N 3/08 |
| | | | 73/818 |
| 9,116,061 B2* | 8/2015 | Li | G01N 3/08 |
| 9,360,397 B1* | 6/2016 | Melton | G01M 99/007 |
| 9,970,844 B2* | 5/2018 | Rastegar | G01N 3/307 |
| 10,830,680 B2* | 11/2020 | Yamagata | G01N 3/08 |
| 10,969,311 B2* | 4/2021 | Kampmann | G01N 3/04 |
| 11,002,647 B2* | 5/2021 | Kuroda | G01N 3/08 |
| 11,231,352 B2* | 1/2022 | Tokuoka | G01N 3/36 |
| 11,549,873 B2* | 1/2023 | Matsuura | G01N 3/10 |
| 11,680,880 B2* | 6/2023 | Ader | G01N 3/066 |
| | | | 73/831 |
| 11,692,952 B1* | 7/2023 | Li | G01N 3/08 |
| | | | 378/4 |
| 11,933,768 B2* | 3/2024 | Tremblay | G01N 3/24 |
| 11,959,888 B2* | 4/2024 | Dai | G01L 1/242 |
| 12,038,415 B2* | 7/2024 | Wolff | G01L 5/0038 |
| 12,050,206 B2* | 7/2024 | Tremblay | G01N 3/04 |
| 12,130,212 B2* | 10/2024 | Fischer | G01M 7/08 |
| 12,140,573 B2* | 11/2024 | Mathieu | H01M 10/4285 |
| 12,216,093 B1* | 2/2025 | Greer, Jr. | G01N 3/04 |
| 2020/0103322 A1 | 4/2020 | Regimand et al. | |
| 2021/0096048 A1 | 4/2021 | Matsuura | |
| 2024/0035800 A1* | 2/2024 | Meyer | G01N 3/04 |
| 2024/0201058 A1* | 6/2024 | Mead | G01N 3/04 |
| 2025/0044186 A1* | 2/2025 | Fischer | G01M 7/08 |
| 2025/0164365 A1* | 5/2025 | Fuller | G01N 3/08 |

* cited by examiner

HYDRAULIC OVER ELASTIC SEPARATION MECHANISM

FIELD OF THE INVENTION

This disclosure relates to an apparatus and method for testing a variety of fluid couplings under separation conditions. In one application, the apparatus may be used to mimic coupling separation conditions for hydraulic, pneumatic and propellant couplings used in association with launch vehicles.

BACKGROUND OF THE INVENTION

A launch vehicle positioned on a launch pad prior to lift off typically has three types of fluid connections to ground stations that supply needed fluids to or exhaust fluids from the launch vehicle prior to lift off. In one example, the supply lines provide propellant, typically in the form of a liquid cryogen, which is continuously boiling off while the launch vehicle is on the launch pad. Vent lines exhaust from the propellant tank gases generated as a result of the propellant boil off. Hydraulic fluids are supplied for engine movement. Pneumatic fluids are supplied for purges, ignition systems or control circuits.

For each supply and vent line, there are two couplings. One associated with the launch vehicle and one associated with a ground position. Just prior to or during the launch, the couplings separate disconnecting the launch vehicle from the ground-based supply and vent lines. In normal circumstances, the couplings associated with the ground positions are repeatedly reused over multiple launches.

In addition, the number and size of the fluid supply lines, vent lines and the associated couplings vary depending upon the launch vehicle configuration. A single launch pad, for example, Cape Canaveral in Florida, will often serve multiple different launch vehicles made my multiple different entities. The launch vehicles themselves will not only vary in design but each launch vehicle may utilize one or more boosters depending upon the nature of the mission of the spacecraft to be launched. Accordingly, a wide and diverse number of supply lines, vent lines and couplings are needed.

Equally important, the couplings need to be tested to ensure that they will function properly. An important part of any testing is a separation test to mimic the conditions of coupling separation at launch. Propellant, hydraulic and pneumatic lines present different testing challenges. For example, propellant pressurization lines are often up to 1.5 inches in diameter and the media is a compressible fluid. Up to 10,000 lbs. of force is needed to maintain the coupling connection. Hydraulic lines are typically approximately 1.0 inches in diameter. Hydraulic fluids are incompressible. Between 500 and 3,500 lbs. of force is needed to maintain the hydraulic coupling connection. Pneumatic lines are typically the smallest in diameter, ranging between 0.25 and 1.0 inches. Pneumatic fluids are compressible. Between 900 and 8,600 lbs. force is needed to maintain the pneumatic coupling connection. During separation, cryogenic and pneumatic fluids tend not to resist coupling separation. Hydraulic fluids behave differently. When decoupling, hydraulic fluids initially do not oppose coupling separation but at approximately half-way through a separation, the hydraulic fluid generates an internal vacuum within the supply line which opposes coupling separation. In general, every coupling initially generates a force or plug load that supports or does not oppose separation. The generated force is proportional to the diameter of the supply line. Smaller diameter supply lines generate smaller separation forces. Larger supply lines generate larger separation forces. For the supply line diameters ranging between 0.25 and 1.5 inches the separation force initially generated in decoupling a supply line can range from approximately 400 lbs to 10,000 lbs.

Presently, different test apparatus is used to test the couplings associated with different types of supply and vent lines. No single test apparatus is acceptable or adequate to cover the many varied scenarios involving different compressible and incompressible fluids and the different ranges in supply line and vent line sizes. Separation of coupling components during testing requires energy input, usually in the form of hydraulic actuators. Expensive hydraulic pumps are needed to mimic the large separation forces associated with large propellant lines. To safely control such high pressures, large and expensive fluid flow control valves are needed which are unnecessarily large and costly for smaller diameter, smaller force scenarios. The separation forces for compressible fluids tend to be linear while the separation forces for incompressible fluids tend to be non-linear, requiring different apparatus and control systems for proper testing conditions. Because variety of coupling sizes across propellant, hydraulic and pneumatic fluids, multiple different test apparatus is presently used to provide testing of the varied conditions. Accordingly, a need exists for a single test apparatus for testing coupling separation for a variety of test conditions. A further need exists for the test apparatus to be low cost, simple to operate, able to mimic a large range of separation conditions and robust for repeated cycles of testing.

SUMMARY OF THE INVENTION

According to aspects of the present disclosure, a hydraulic test apparatus is provided that is able to mimic the restraining and separation force profiles over time needed to accurately replicate the large forces associated with large diameter propellant supply lines coupling and decoupling, the small forces and profiles associated with small diameter pneumatic supply line coupling and decoupling, and any force coupling and decoupling profiles in between, including those associated with hydraulic supply lines.

According to aspects of the present disclosure, in at least one embodiment, a coupling, typically comprising a male and female component, is positioned in a test apparatus and hydraulic loads are applied to mirror coupling forces. A control system is then used to mirror the separation forces over time as the coupling is separated. Based upon accumulated and available historic data, the separation force profile is known for virtually all known and used couplings, supply line sizes and supply fluids.

According to aspects of the present disclosure, in at least one embodiment, the separation of the coupling components is achieved by release of energy stored in at least one biasing mechanism through controlled venting of pressure from hydraulic actuators rather than by a process which requires hydraulic energy input. Control hardware is simplified.

According to aspects of the present disclosure, in at least one embodiment, the test apparatus comprises a secure base with two or more rails or guides extending from the base. A movable yoke engages the two or more rails and is able to move toward and away from the base. At least one hydraulic actuator is secured to the base. A piston moves within the actuator body or cylinder and a piston rod extends from the piston out of the cylinder. The distal end of each piston rod is attached to the yoke. Coil springs are symmetrically mounted on the two or more rails between the base and the yoke. One or more coil springs may be mounted on each rail. Different springs having different compressive and reactive forces can be substituted. One coupling component is mounted to the base and one coupling component is mounted to the yoke. Pressurizing the hydraulic cylinder to pull the yoke toward the base opposes the force applied by the springs and causes the coupling components to couple. The force applied by the hydraulic actuator mirrors the coupling force. Controlled release of the applied hydraulic force over time mimics a desired separation force profile. More specifically, valving associated with the hydraulic circuit provide timed and controlled release of the pressure in the hydraulic actuator to mimic an infinite number of separation force profiles including linear profiles generally associated with propellant and pneumatic fluids and non-linear profiles generally associated with hydraulic fluids.

According to aspects of the present disclosure, in at least one embodiment, a hydraulic actuator is utilized to engage a set of test components that are to be separated at a specified speed and acceleration. When the separation is commanded a series of valves associated with the hydraulic circuit allows the actuators to vent pressure and extend the piston rods, reversing the restraining force and pulling the components apart at a desired speed and acceleration. The valving is adjustable and controllable allowing for multiple separation speeds or separation speed profiles.

According to aspects of the present disclosure, in at least one embodiment, a load cell is mounted on either the base or the yoke in association with the hardware used to mount one of the coupling components or fittings. Thus, as the hydraulic actuators are actuated to draw the components together or couple the fittings, a compressive force is measured and a target coupling force is achieved. Alternatively, pressure in the hydraulic circuit may be measured and converted into a force by a controller or strain gauges may be positioned on the yoke or at other locations known by those of skill in the art to provide output that can be converted to force.

According to aspects of the present disclosure, in at least one embodiment, one or more spring sets may be mounted on the rails or guides. It is desirable that the individual springs in each spring set have the same characteristics such that the reactive force applied by the springs is symmetrical. Multiple spring sets may be applied to the rails such that each rail has one or more springs associated with it. In addition, one or more spacers may be added to each rail to further adjust the spring rate and/or preload of the mated configuration.

According to aspects of the present disclosure, in at least one embodiment, an accelerometer is mounted to the movable yoke. The purpose of the accelerometer is to measure the speed and acceleration of the yoke during the separation portion of a test. It should be appreciated that other devices and methods may be used to assess the acceleration and position of the yoke, including but not limited to a string potentiometer, laser distance finder, a linear variable differential transformer (LVDT), a linear variable inductive transformer (LVIT), or an imaging system.

According to aspects of the present disclosure, in at least one embodiment, an adjustable mounting plate is part of the mounting hardware used to mount the components or fittings of a coupling to the yoke and base. The adjustability of the mounting plates permit the coupling components to be properly aligned or intentionally misaligned with respect to each other. This allows for further variability in testing. The components may be off center, aligned at an angle or both relative to each other.

According to aspects of the present disclosure, in at least one embodiment, a control system is associated with the hydraulic circuit. A pump circulates hydraulic fluid in the circuit. A controller is in communication with the pump, hydraulic actuators, fluid control valves, load cell and accelerometer. The controller receives input from the hydraulic actuator, load cell, accelerometer, pump and valves and the controller provides input to the hydraulic actuator, pump and valves. A memory may also be part of the control system and is associated with the controller. The memory may contain one or more coupling force profiles and separation speed profiles that are followed for test purposes. The profiles may or may not be based upon accumulated historic data. Alternatively, unique test profiles may be entered by an operator. Firmware or software associated with the controller allows the controller to control the operation of the hydraulic actuators to initially apply a predetermined coupling force based upon feedback of the load cell. The firmware or software also allows the controller to control the position of one or more of the valves based upon feedback from the accelerometer to mirror a separation profile as part of a test procedure. In at least one embodiment, a single direction control valve and a single metering valve, under the operation of a controller, is sufficient to mirror desired separation profiles. In at least one embodiment, the separation profile may be achieved without the input of a hydraulic pump by utilizing energy stored in at least one biasing mechanism such as a compression spring.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the exemplary claims set forth herein, taken in conjunction with this Summary of the Invention, define the invention.

BRIEF DESCRIPTION OF DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and, together with the general description of the invention given above and the detailed description of the drawings given below, serve to explain the principles of the invention.

The drawings are not necessarily to scale and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
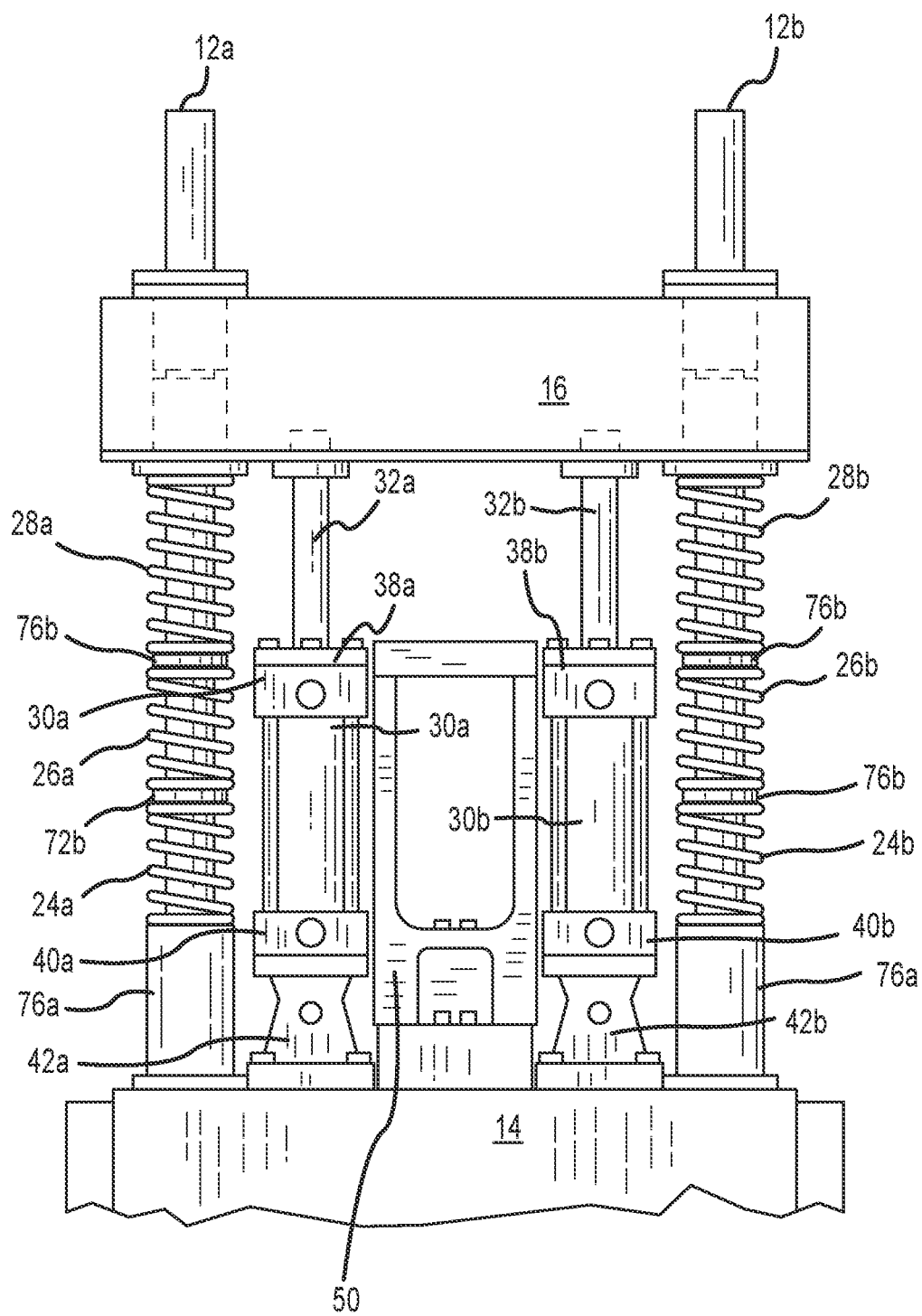
FIG. 1 is a front elevation view of one embodiment of a test separation apparatus according to the present disclosure.
Figure 2:
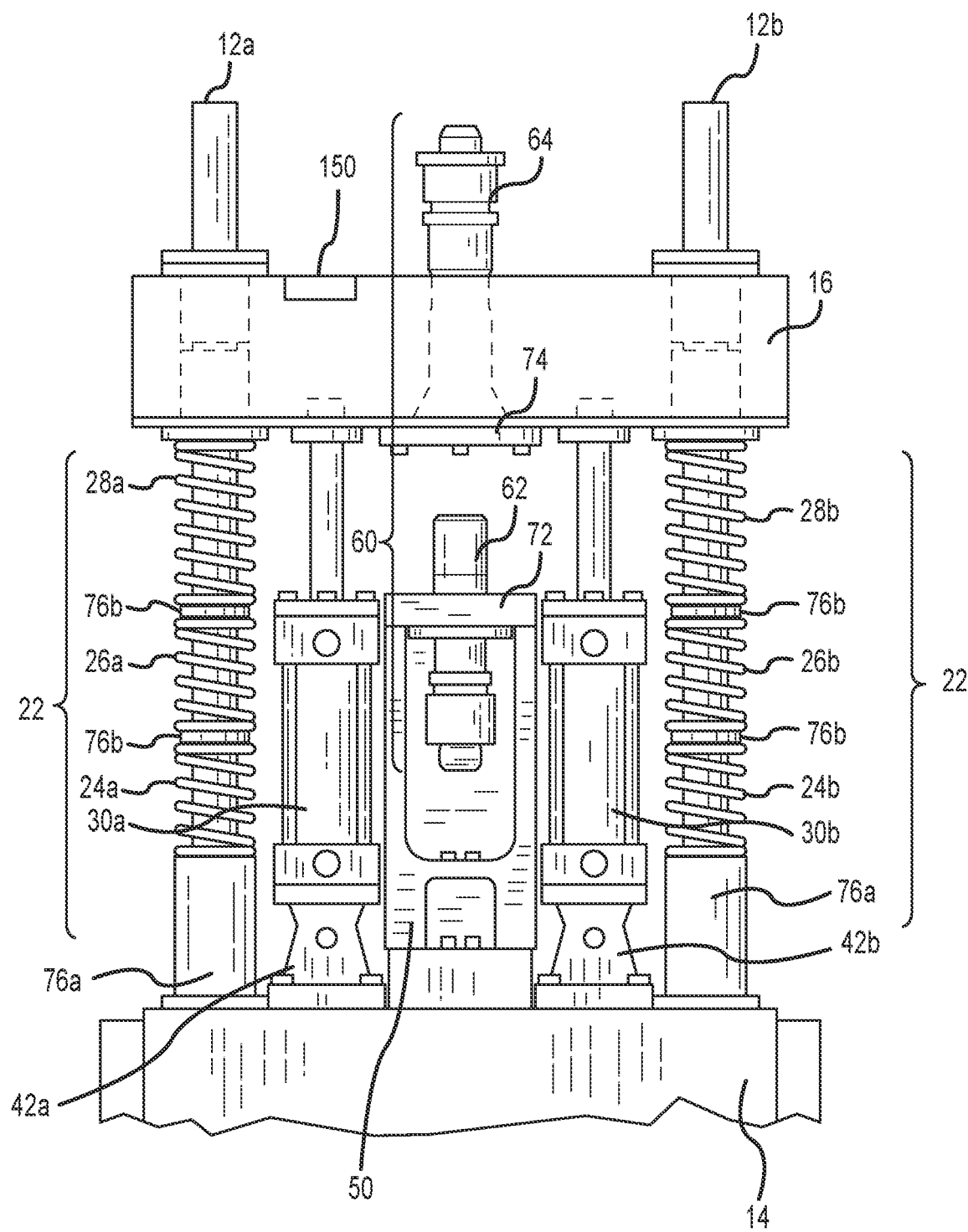
FIG. 2 is a front elevation view of the mechanism of FIG. 1, further illustrating two fittings of a coupling mounted to the test apparatus.

Turning to FIGS. 1-4, one embodiment of a test apparatus 10 according to the present disclosure is illustrated. In one embodiment, a pair of rails 12a and 12b extend from a base 14. A yoke 16 engages the rails 12a and 12b and moves or slides relative to the rails toward and away from the base 14. As best seen in FIG. 3A, one or more collars or bushings 18 form an aperture in the yoke 16 and slidably engage the rails 12a and 12b. The rails are secured to the base 14 by mounting nuts 20a and 20b. As will be explained in further detail below, a biasing mechanism 22 is associated with each rail 12a and 12b to bias the yoke 16 away from the base 14. As illustrated, the biasing mechanism is three sets of coil springs 24a and 24b, 26a and 26b and 28a and 28b and spacers 76a. The biasing springs 24, 26 and 28 are provided in pairs to provide equal biasing force to the yoke 16. The spacers 76a allow a change in preload force to the coupled apparatus. A taller or longer spacer, such as 76a illustrated in FIG. 3A, will result in higher starting spring force than a shorter spacer. Shorter spacers 76b are illustrated in FIGS. 1 and 2. Each set of springs may provide the same or a different biasing force and the other spring sets. Although two rails are illustrated, the test apparatus may utilize a single rail or more than two rails.

Figure 3A:
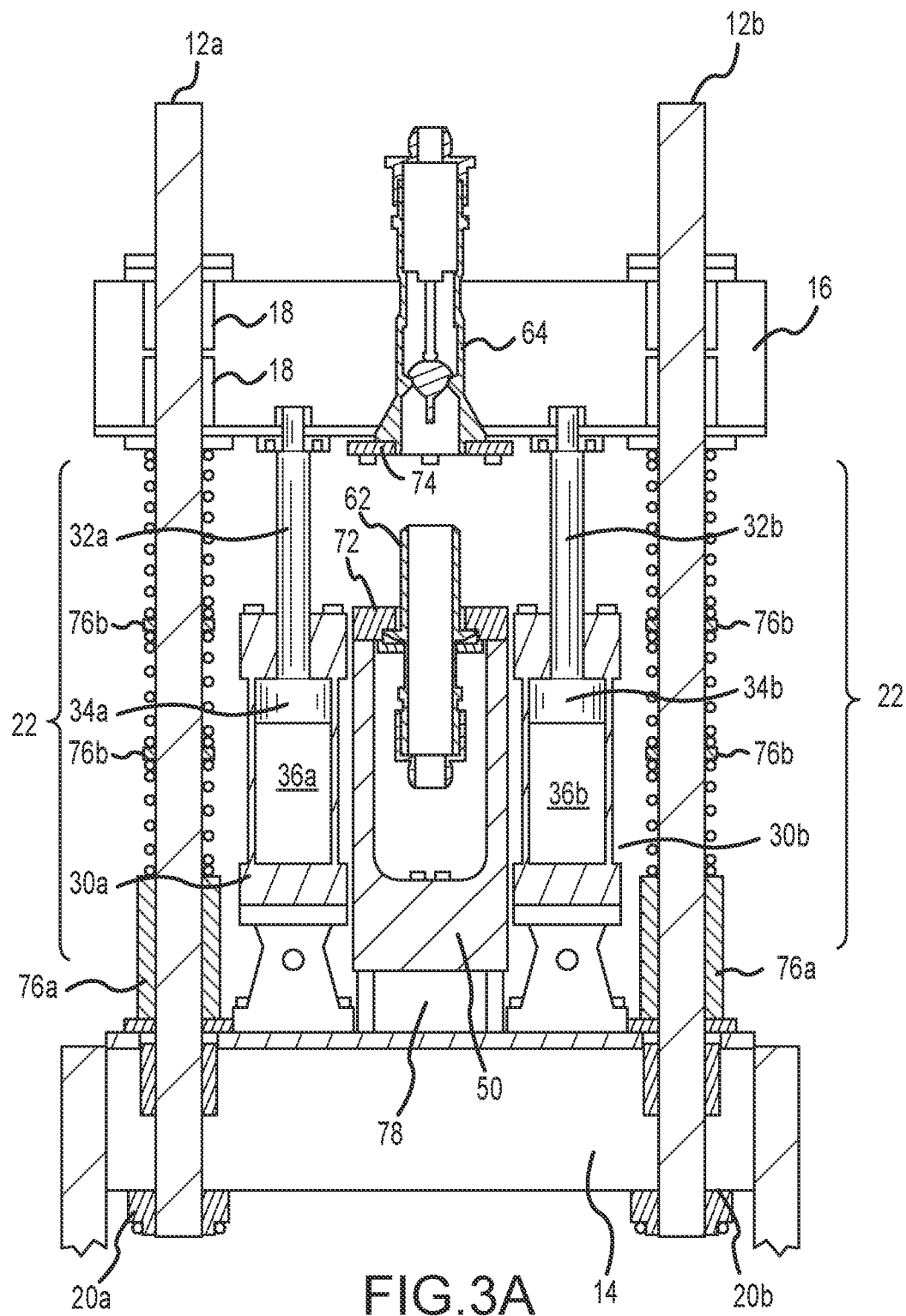
FIG. 3A is a cross-section view of the embodiment of FIG. 2, with the fittings separated.
Figure 4:
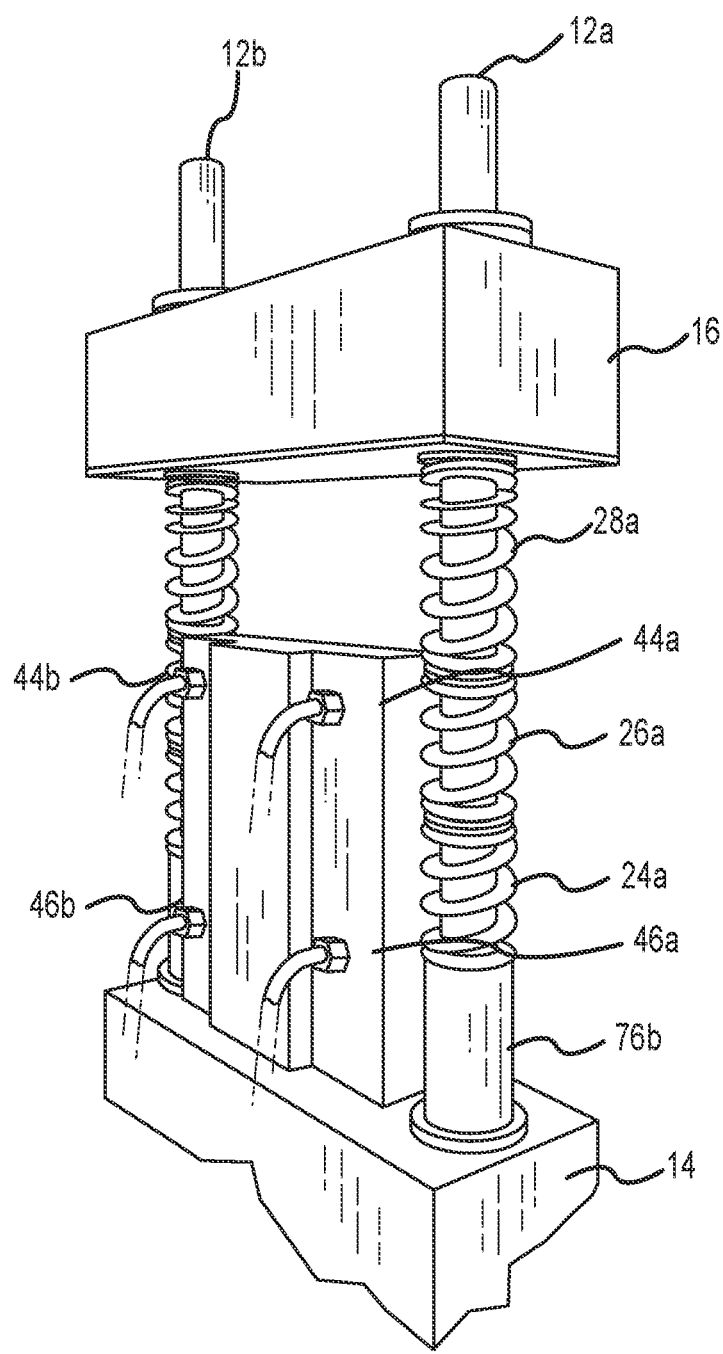
FIG. 4 is a rear perspective view of the apparatus of FIG. 1.

A pair of hydraulic cylinders 30a and 30b, each having a piston rod 32a and 32b and piston 34a and 34b located at the distal end of the piston rod 32a and 32b extend between the base 14 and the yoke 16. As best seen in FIG. 3A, the proximal end of the piston rod 32a and 32b are connected to the yoke 16. The piston 34a and 34b reciprocate within a chamber 36a and 36b of the cylinder 30a and 30b. Each cylinder 30a and 30b has a first end 38a and 38b through which the piston rod 32a and 32b extends and an opposite second end 40a and 40b. As illustrated, the second end 40a and 40b is connected to the base 14 by a mounting bracket 42a and 42b. As best seen in FIG. 4, hydraulic fluid may be introduced or removed from the chambers 36a and 36b by way of a first hydraulic fluid port 44a and 44b and a second hydraulic fluid port 46a and 46b. It should be appreciated that the position of the hydraulic cylinders 30a and 30b relative to the base 14 and yoke 16 may be reversed. In other words, the second end 40a and 40b of the hydraulic cylinders 30a and 30b may be connected to the yoke and the proximal end of the piston rods 32a and 32b may be connected to the base 14.

A fitting mounting bracket 50 is also illustrated in FIG. 1 affixed to the base 14. The bracket 50 is configured to secure one fitting of a fluid coupling. The second fitting of the coupling is secured to the yoke 16 as seen in FIG. 2. In order to test couplings of different sizes and shapes, the bracket 50 may be replaced with differently configured mounting brackets designed to secure differently configured first fittings. Similarly, the yoke 16 may be replaced with different yokes each configured to secure a different, second fitting that mates with the first fitting secured in bracket 50. Alternatively, a separate second mounting bracket (not shown) may be affixed to a yoke 16 to hold the second fitting of a fluid coupling. The separate second mounting bracket may be replaced with other second mounting brackets to secure differently shaped second fittings. FIG. 2 illustrates a fluid coupling 60 comprising a male fitting 62 and a female fitting 64. The male coupling 62 is secured to mounting bracket 50 and the female fitting 64 is secured to the yoke 16. It should be appreciated that he placement of the fitting could be switched with female coupling 64 secured in bracket 50 and male fitting 62 secured in the yoke 16 or a mounting bracket secured to the yoke 16.

Figure 3B:
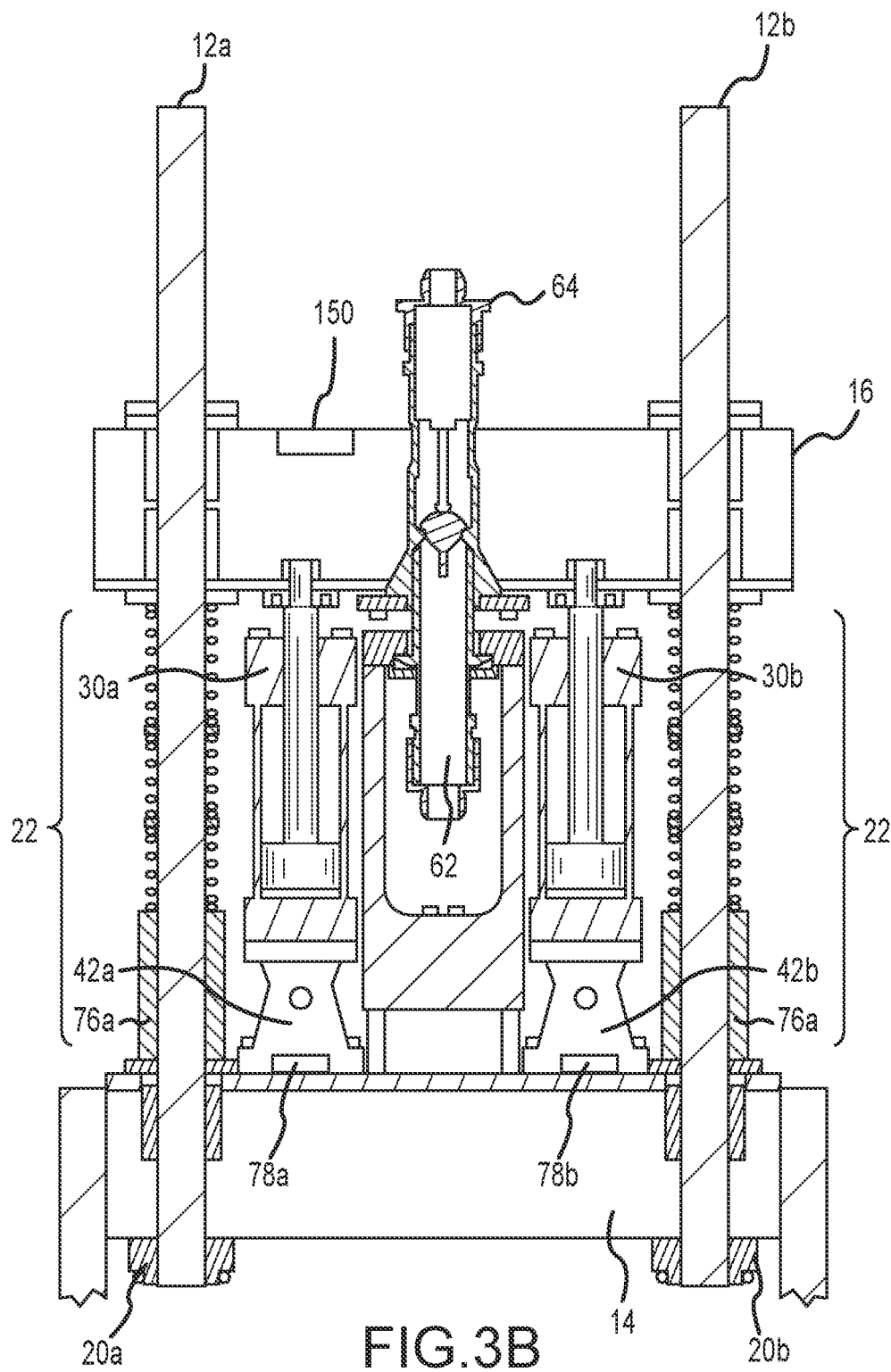
FIG. 3B is the cross-section view of FIG. 3A, with the fittings joined.

With reference to FIGS. 3A and 3B, alignment plates 72 and 74 are associated with the mounting bracket 50 and yoke 16, respectively. The alignment plates 72 and 74 are repositionable at least laterally relative to the structure to which they are attached. In other embodiments, the alignment plates 72 and 74 may be angularly repositionable relative to the mounting bracket and yoke. Thus, alignment plate 72 may be repositioned relative to mounting bracket 50 and alignment plate 74 may be repositioned relative to yoke 16. The alignment plates 72 and 74 are used to position the fittings 62 and 64 relative to each other. When positioned correctly, the alignment plates 72 and 74 align the fittings 62 and 64 to couple and decouple without interference. But in actuality, the fittings of a coupling may be misaligned within some acceptable range. By repositioning one or both alignment plates, the test apparatus may test the decoupling of fittings under ideal (aligned) and non-ideal (e.g., misaligned) conditions. In addition, the extent of the misalignment may be increased to determine outer limits to the decoupling of a coupling.

In another aspect of the present disclosure, a force measuring device 78 is associated with at least one and preferably all hydraulic cylinders 30a and 30b to measure the force or load applied when hydraulic fluid is added to the fluid chambers 36a and 36b on the upper side of the pistons 34a and 34b through ports 44a and 44b. In a preferred embodiment, the force measuring device is one or more load cells, for example load cells 78a and 78b illustrated in FIG. 3B. Examples of applicable load cells include strain-gauge load cells, inductive and reluctance load cells and magnetostrictive load cells. In a preferred embodiment, the load cells are multi-axis load cells capable of measuring side forces or bending moments from the misalignment introduced by repositioning the alignment plates 72 and 74 discussed previously. Introduction of hydraulic fluid into ports 44a and 44b forces the pistons 36a and 36b toward the base 14 and pulls the yoke 16 towards the base 14. In the embodiment of FIGS. 1-5C, spring sets 24, 26 and 28 oppose the travel of the yoke 16 toward the base 14. Varying the spring sets will vary the force required to be applied by the hydraulic cylinders 30a and 30b to move the yoke 16 and to join or couple fittings 62 and 64. Different coil springs will resist compression differently allowing the test apparatus to apply different resistances consistent with actual coupling loads. As also illustrated, spacers 76a and 76b may be used in combination with the spring sets to alter or adjust further the force needed to draw the yoke 16 toward the base 14 and complete the coupling of the fittings 62 and 64. The objective is to reproduce or mimic the amount of coupling pressure or load needed to maintain the coupling of the fittings 62 and 64 consistent with actual conditions. As previously noted, a launch vehicle includes numerous pneumatic and hydraulic couplings that separate on launch. The force needed to decouple a pair of fittings can range between 400 and 10,000 lbs. Varying the spring sets 24, 26 and 28, together with added spacers 76a and/or 76b, can create load scenarios that recreate launch pad loading of the various couplings.

Figure 5A:
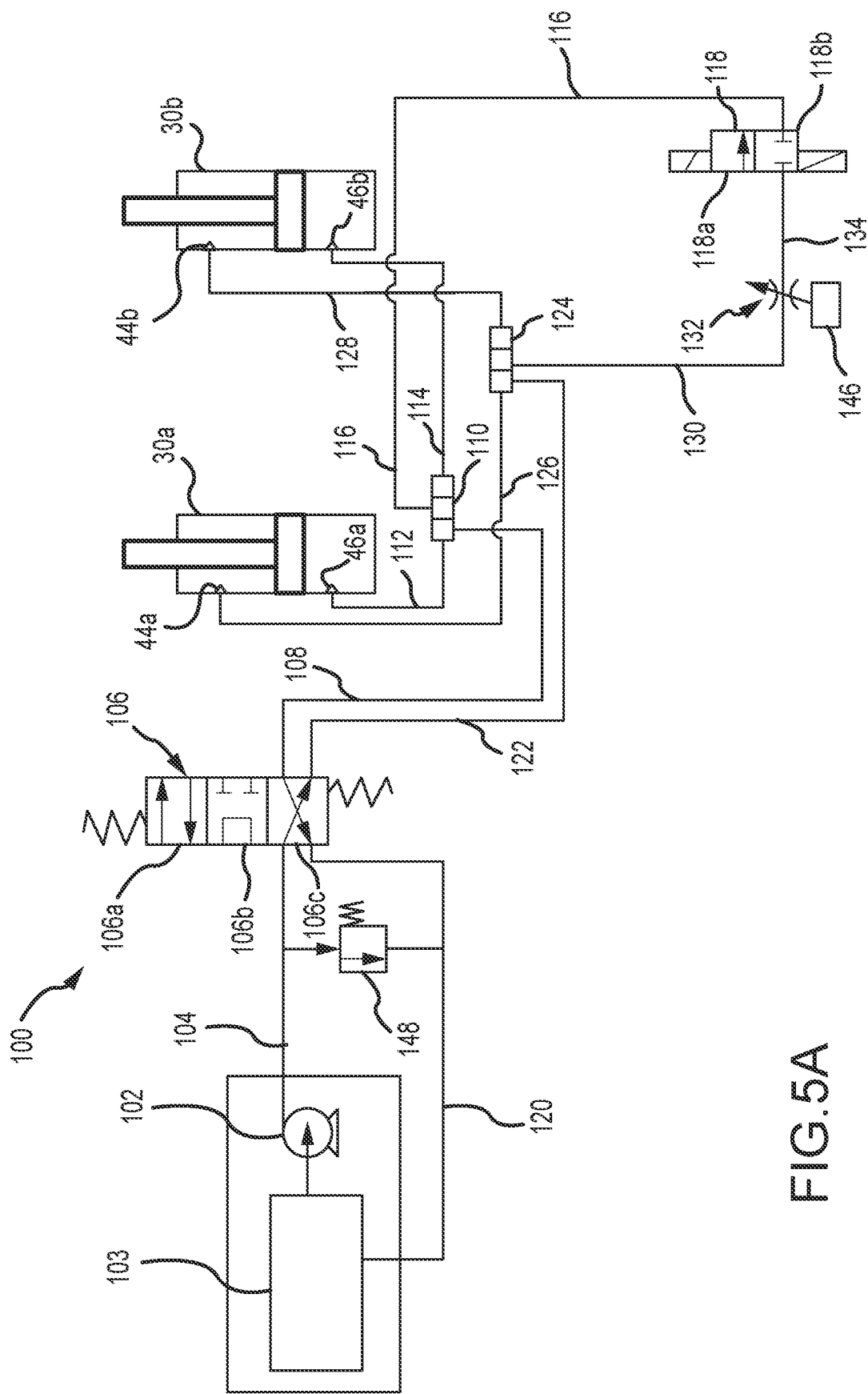
FIG. 5A is a schematic diagram of one embodiment of a hydraulic circuit associated with the apparatus of FIG. 1, in a first state.
Figure 5B:
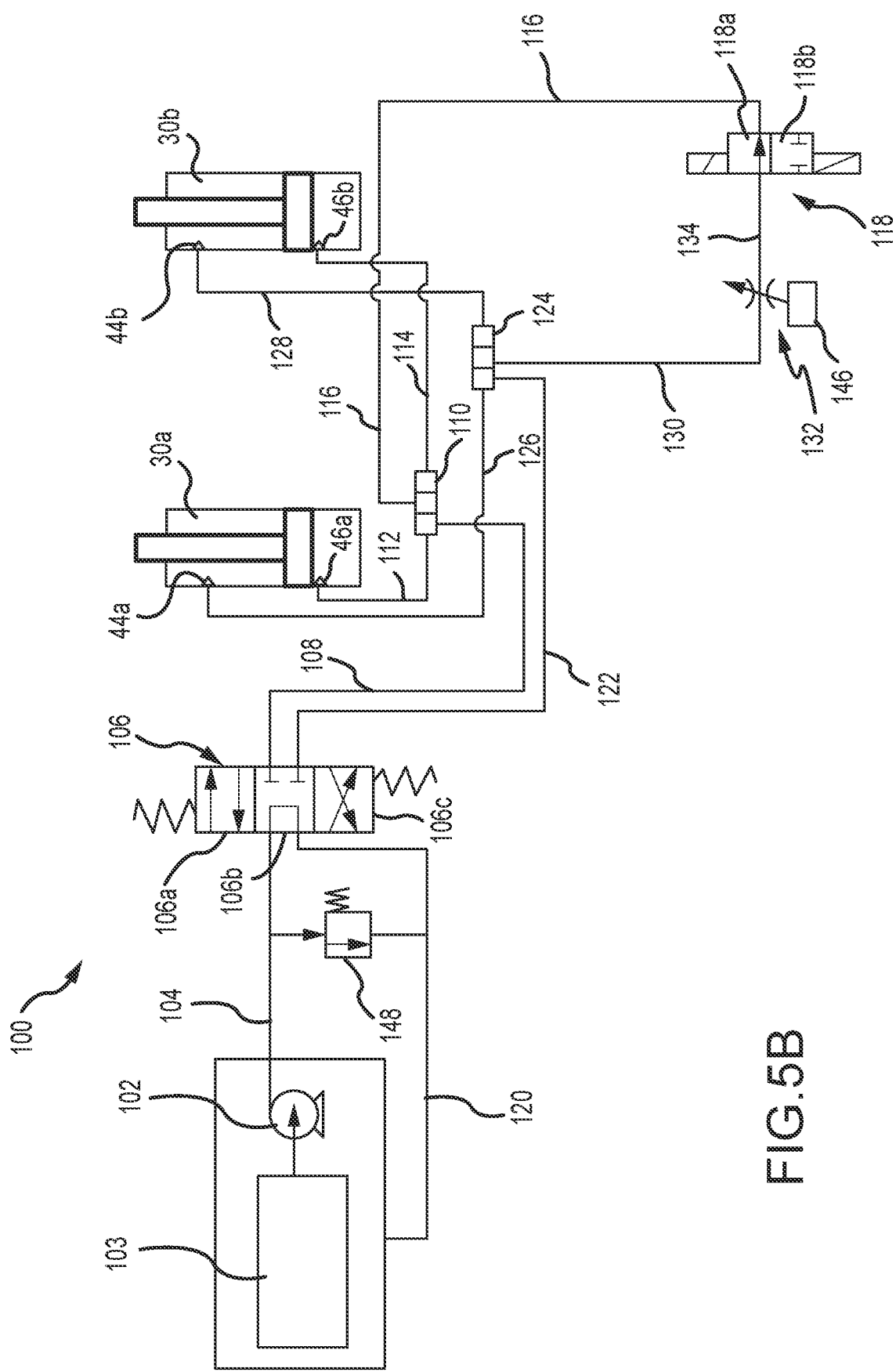
FIG. 5B is a schematic diagram of one embodiment of a hydraulic circuit associated with the apparatus of FIG. 1, in a second state.
Figure 5C:
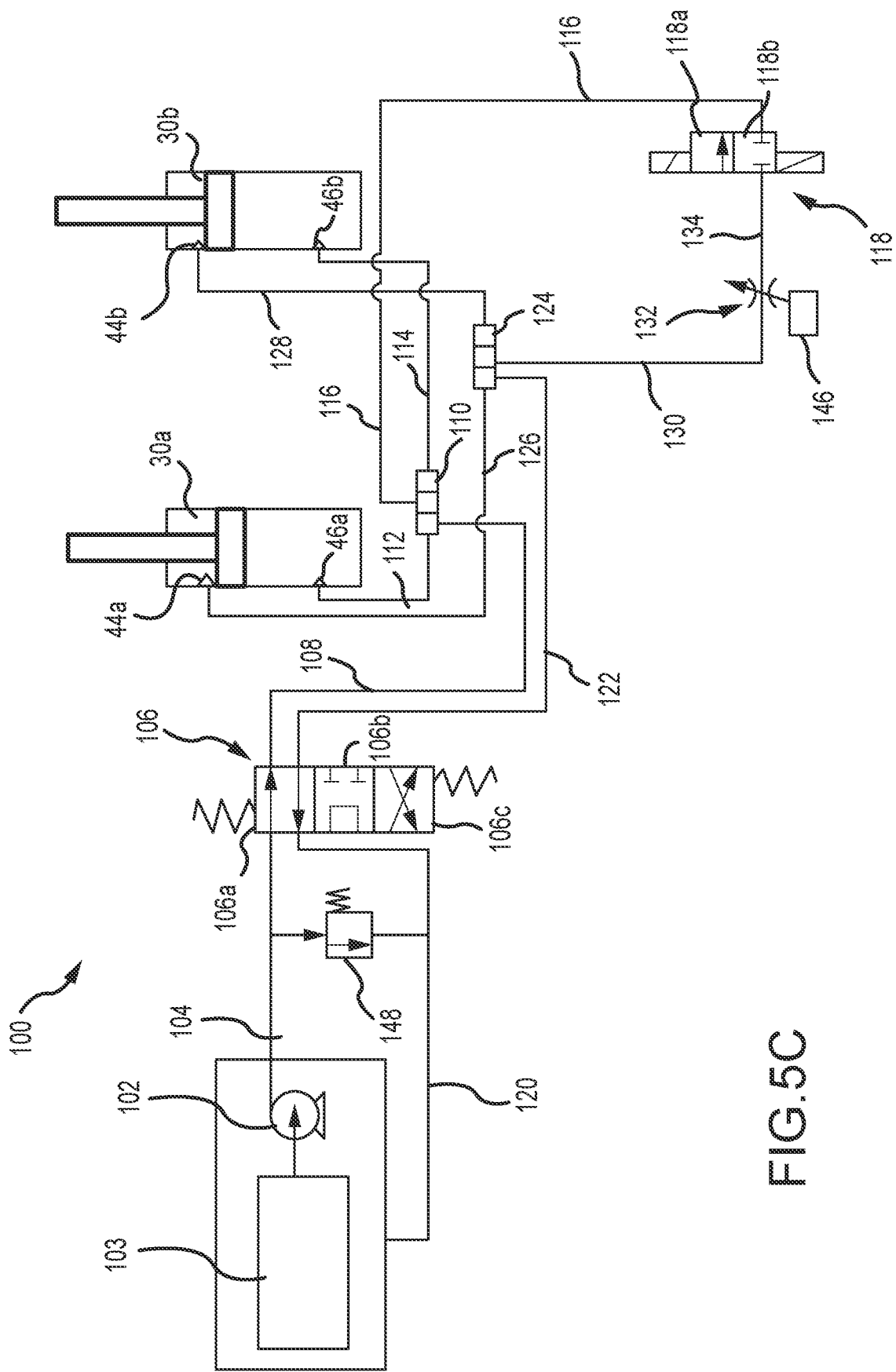
FIG. 5C is a schematic diagram of one embodiment of a hydraulic circuit associated with the apparatus of FIG. 1, in a third state.

Turning to FIGS. 5A-5C, a hydraulic fluid circuit 100 is shown for supplying and controlling the supply of hydraulic fluid to chambers 36a and 36b of hydraulic cylinders 30a and 30b. A pump 102 supplies hydraulic fluid from a reservoir 103 to the fluid circuit. A first supply line 104 fluidly interconnects the pump 102 to a variable position control valve 106. In one embodiment, the variable position control valve 106 is a three-position directional control valve that controls the flow of the fluid in and out of the first and second fluid ports 44a and 44b and 46a and 46b. A second fluid supply line 108 fluidly connects the valve 106 to a first extension manifold 110. A third supply line 112 fluidly interconnects the first extension manifold 110 with port 46a of hydraulic cylinder 30a. A fourth fluid supply line 114 fluidly interconnects the extension manifold 110 with port 46b of hydraulic cylinder 30b. A fifth fluid supply line 116 interconnects the first fluid extension manifold 110 with a second two-position flow control valve 118. In a preferred embodiment, the second control valve 118 is a two-position flow control valve. A first fluid return line 120 fluidly interconnects the reservoir 103 to the return of valve 106. A sixth fluid supply line 122 fluidly interconnects the control valve 106 to a retraction manifold 124. A seventh fluid supply line 126 fluidly interconnects the retraction manifold 124 with port 44a of the hydraulic cylinder 30a. An eighth fluid supply line 128 fluidly interconnects the retraction manifold 124 with port 44b. A ninth fluid supply line fluidly interconnects the retraction manifold 124 to a variable position valve 132. In a preferred embodiment, the variable position valve 132 is a throttle valve. A tenth fluid supply line 134 fluidly interconnects the variable position valve 132 and the two-position flow control valve 118.

FIG. 5A is representative of the hydraulic circuit 100 in a priming or pre-test state. The first variable position control valve 106 as illustrated has three positions and valve position 106c is aligned with fluid supply lines 104, 108 and 122 and return line 120. In addition, valve position 118b of the second flow control valve 118 is aligned with fluid supply lines 134 and 116. With valves 106 and 118 positioned in this manner, pump 102 supplies hydraulic fluid through supply line 126 to port 44a of hydraulic cylinder 30a and through supply line 128 to port 44b of hydraulic cylinder 30b. As a result, the pistons 34a and 34b are pushed downward (relative to FIG. 5A) and the yoke 16 moves toward the base 14. One or more spring sets 24, 26, 28 resist the movement of the yoke toward the base. Load cells 78a and 78b associated with the hydraulic cylinders 30a and 30b measure the compression force or load applied by the yoke 16 due to the hydraulic pressure in the fluid circuit 100. The pump 102 increases hydraulic pressure in the fluid circuit until the couplings 62 and 64 are fully joined and the load equals a desired test load.

FIG. 5B illustrates the test apparatus set up for conducting a fitting decoupling test. Here, valve position 106b of the first variable position control valve 106 is aligned with the supply lines 104, 108 and 122 and return line 120. Valve position 106b blocks flow of hydraulic fluid through valve 106 during a test. The second flow control valve 118 is repositioned such that valve position 118a is aligned with supply lines 134 and 116 allowing hydraulic fluid to move from supply line 134 into line 116. Variable position control valve 132 is initially closed. Opening the variable position control valve 132 releases the hydraulic pressure in the fluid supply circuit allowing the fluid to move from the upper portion of each chamber 36a and 36b through second ports 46a and 46b and into the lower portion of each chamber 36a and 36b through first ports 44a and 44b. The position of the opening of the valve 132 may be varied over time to follow a desired decoupling force profile.

As previously noted, when dealing with incompressible fluids, such as hydraulic fluids, the decoupling force profile is more complex. Hydraulic fluids initially do not oppose coupling separation but at approximately half-way through a separation, the hydraulic fluid generates a vacuum within the supply line which opposes coupling separation. To mimic this type of profile, once the biasing mechanisms 22 are compressed and the fittings coupled, the system is ready for a test run (as shown in FIG. 5B). Valve 118 is then used to control the separation and the pump 103 is not involved further in system pressures. In the pre-test compressed state, ports 44a and 44b are under pressure from the biasing mechanism 22 (one or more spring sets and, optionally, spacers). Valve 118 is then opened to apply the pressure to ports 46a and 46b opening the setup. In the situation where the unit under test (UUT) switches to opposing separation, e.g., in the case of a hydraulic fluid, then valve 132 is opened farther at that point so that more pressure is applied to ports 46a and 46b to overcome the additional force generated by the internal vacuum.

Figure 6:
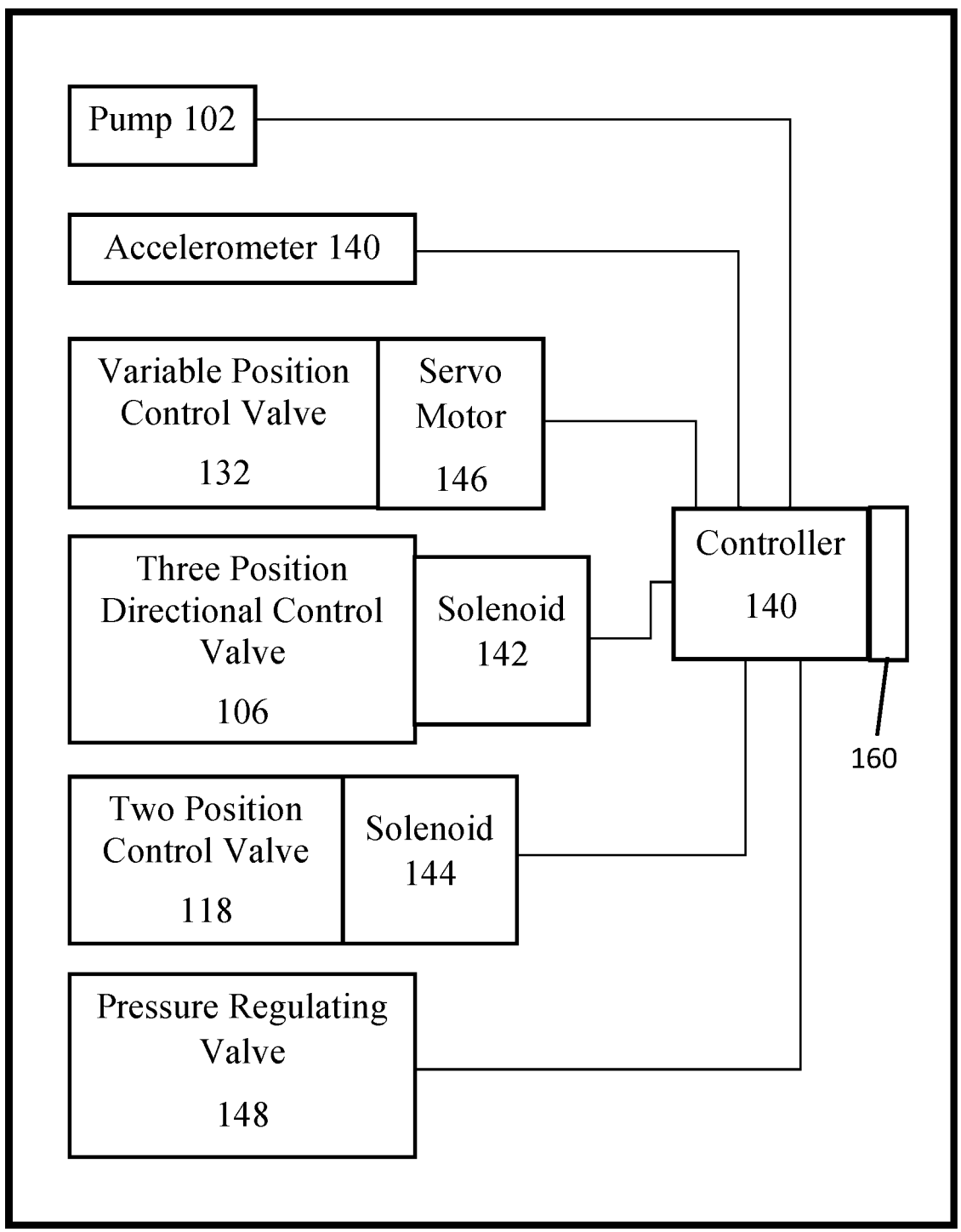
FIG. 6 is a block diagram of one embodiment of control logic for the apparatus of FIG. 1.

According to another aspect of the present disclosure, the fluid circuit 100 may include a hydraulic control system as illustrated in FIG. 6. Central to the control system is a system controller 140 which communicates with the system components. The controller 140 communicates with pump 102 to control the speed of the pump 102, as well as to turn it on or off. The controller 140 controls the position of valve 106 through communication with solenoid 142, the position of valve 118 through communication with solenoid 144 and the position of variable position valve 132 through communication with servo motor 146. An accelerometer 150 may also be part of the test apparatus according to aspects of the present disclosure. The accelerometer 150 is affixed to the yoke 116 and senses the acceleration of the yoke relative to the stationary base 104 and provides feedback or acceleration data to the controller 140. During a test, the position of the valve 132 may be altered by servo motor 146 based upon input or control signals sent from the controller 140 which, in turn, are based upon data sensed by accelerometer 150 and sent to the controller 140.

Optionally, a memory 160 may be associated with the controller 140. The memory may store one or more force v. time profiles for decoupling tests. The profiles may be based upon data captured as part of actual launches or may be one or more testing profiles developed as needed. The stored data includes the force or load needed to maintain the fittings coupled or joined together, i.e., while a launch vehicle is on a launch pad with connected fluid lines. It also includes separation acceleration data over time and changes in pressure within the hydraulic, pneumatic and propellant supply lines over time as the fittings separate. Software may also be stored in memory 150 for use by the controller 140 in conducting the testing and controlling the various test apparatus.

As also illustrated in FIG. 6, a pressure regulating valve 148 is provided as a safety precaution to prevent over pressurization of the system, including the hydraulic cylinders 30a and 30b. Opening the valve 148 returns fluid to reservoir 104 from the pump 102 reducing system pressure.

To conduct a coupling separation test, the throttle position of the variable position valve 132 is initially closed. Data from the one or more load cells 78a and 78b identifies the initial pressure or load maintaining the fittings 62 and 64 in a coupled position. The variable position valve 132 is then opened in a controlled manner to follow a test separation profile using a pressure/acceleration versus time profile. With this data available to the controller 150, a test may be conducted that mimics actual separation events. The controller will drive the pump 102 to pressurize the cylinders 30a and 30b until the load cells 78a and 78b measure the desired load condition. The controller will then control the opening of the variable position control valve 132 using servo motor 146. As the valve 132 is opened, the force stored in at least one spring set, e.g., 24, will push the yoke 16 away from the base 14 causing the fittings 62 and 64 to begin separation. Using data input from the accelerometer 150 and the load cells 78a and 78b, the controller 140 will vary the opening of the variable position valve 132 to cause the separation of the fittings to mimic that of an actual launch. It will be appreciated that the test can be rerun numerous times with the same or different pressure release profiles to mimic different conditions. As previously noted, the fittings 62 and 64 may be misaligned or offset to acquire additional test data. And different fittings of different sizes and shapes may be tested in the same apparatus thereby simplifying and reducing costs associated with testing the decoupling of hydraulic and pneumatic fittings.

Once a test is completed, the hydraulic system may then be reconfigured to the state illustrated in FIG. 5C. Here, controller 140 activates solenoid 142 to moves valve 106 such that position 106a is aligned with supply lines 104, 108 and 122 and return line 120 and solenoid 144 is activated by controller 140 to cause valve position 118a of valve 118 to align with supply lines 116 and 134. With the valves in these positions, the hydraulic fluid will readily flow between the ports 44a and 46a and between ports 44b and 46b allowing the yoke 16 may be manually separated from the base 14. In turn, this separation allows the fittings 62 and 64 to be moved or replaced and further allows the yoke to be removed and the spring sets changed.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

Figure 7:
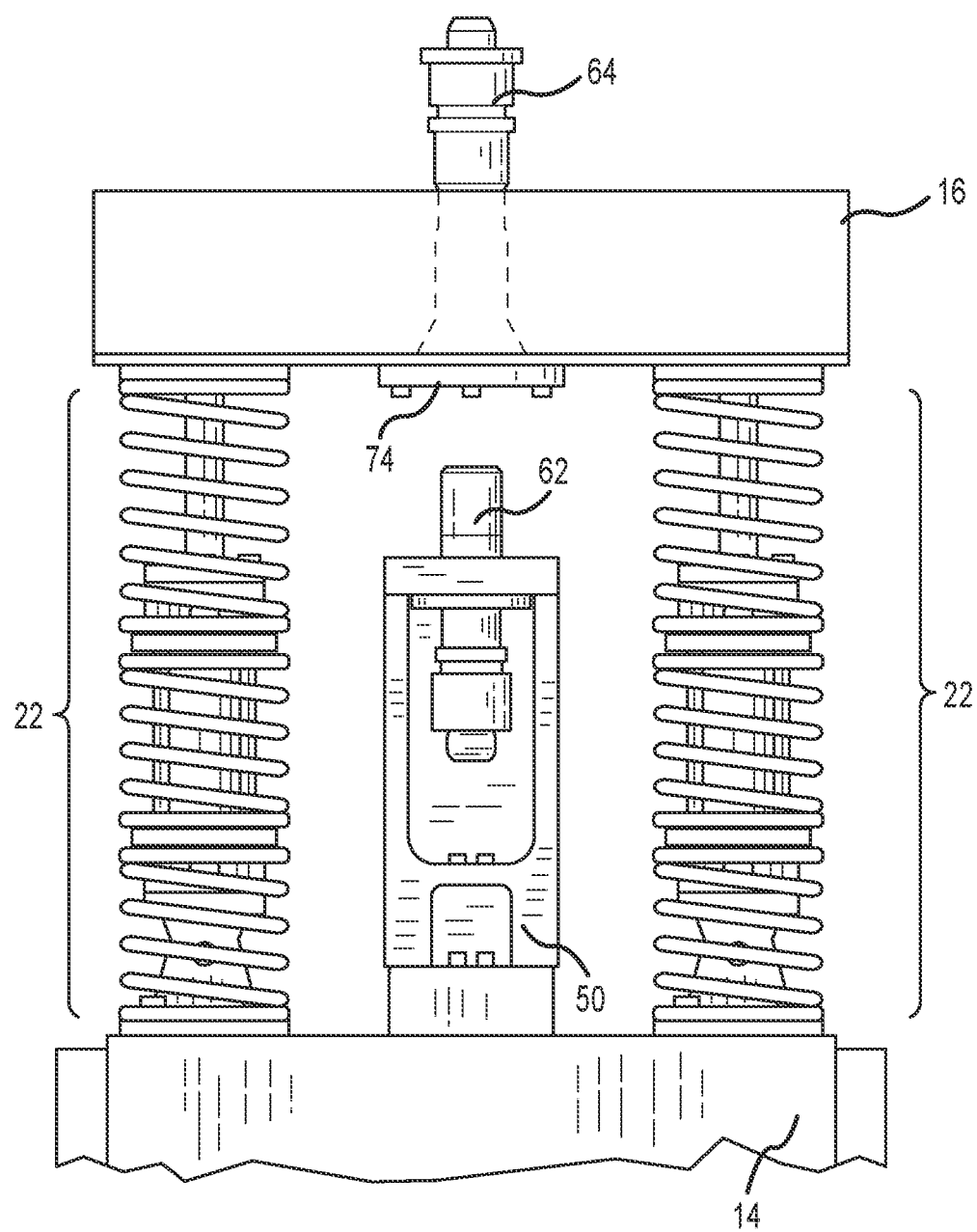
FIG. 7 is a front elevation of an alternative embodiment of a test apparatus according to the present disclosure.
Figure 8:
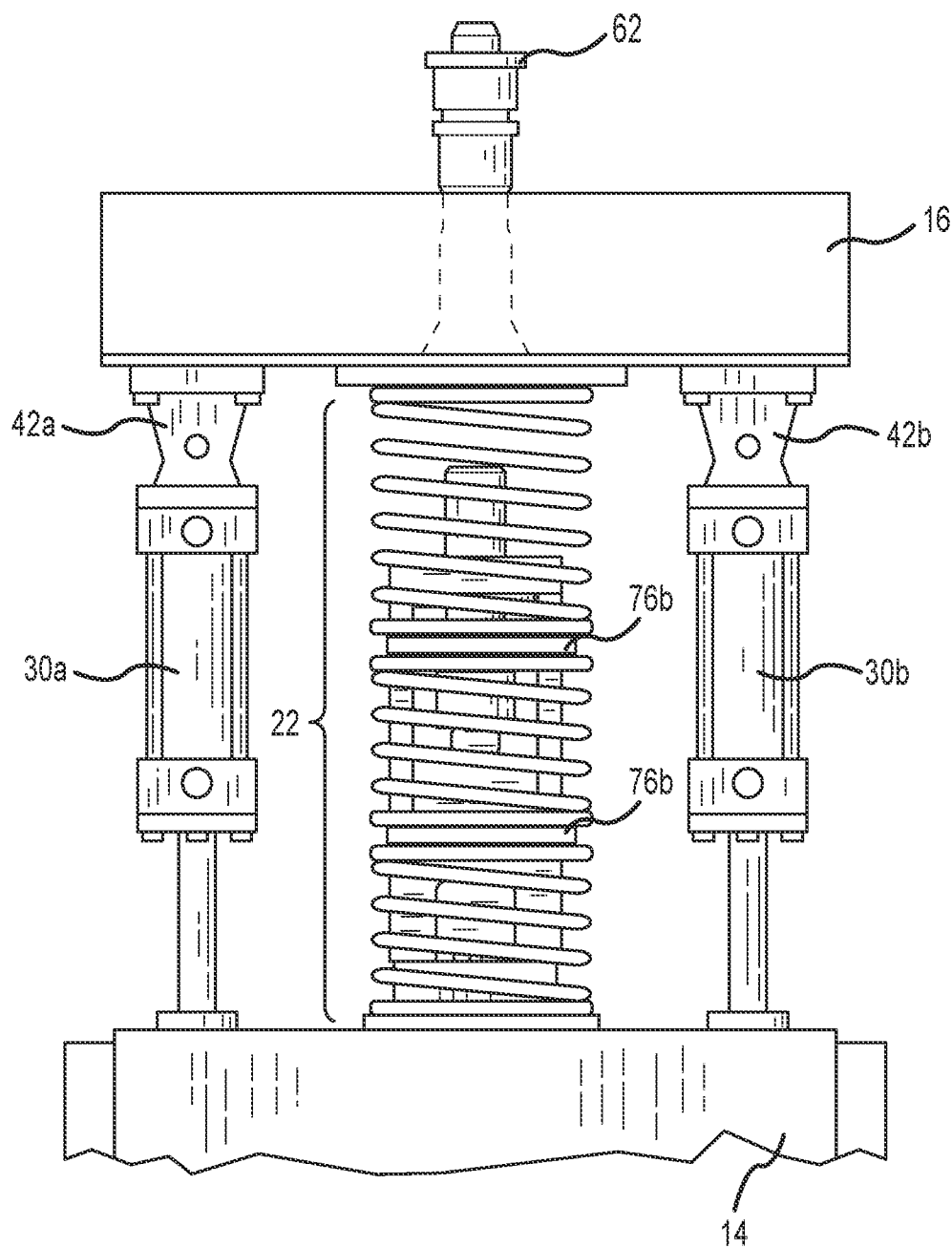
FIG. 8 is a front elevation of another alternative embodiment of a test apparatus according to the present disclosure.

As one example of an alternative embodiment within the scope of the present disclosure, the biasing mechanism 22 could be repositioned to surround each hydraulic cylinder 32 rather than the rails 12 with the hydraulic cylinders moved laterally for spacing purposes. The rails 12 may be retained or eliminated. One example of this embodiment is illustrated in FIG. 7. Similarly, a biasing mechanism may instead surround the couplings 62 and 64 and the bracket 50 with the hydraulic cylinders 30a and 30b repositioned laterally. The rails may be retained or eliminated. One example of this embodiment is illustrated in FIG. 8, which also shows the hydraulic cylinders inverted compared to the other figures.

As another example of an alternative embodiment, flow control valve 118 and variable flow control valve 132 may be combined so the that metering of flow and on/off aspects are in the same valve. One example would be a servo-flow control valve.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

The features of the various embodiments described herein are not intended to be mutually exclusive when the nature of those features does not require mutual exclusivity. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by use of the terms or phrases "for example," "such as," "by way of example," "e.g.," and other language commonly understood to indicate that what follows is an example.

What is claimed is:

1. A testing apparatus for fluid fittings, comprising:
  a base;
  a first rail and a second rail connected to and extending in the same direction from the base, the first rail spaced from the second rail;
  a cross yoke slidably mounted on the first and second rails and movable toward and away from the base;
  at least one biasing mechanism disposed between the base and the cross yoke and configured to apply a force separating the cross yoke from the base;
  a first hydraulic cylinder and a second hydraulic cylinder, each first and second hydraulic cylinder comprising a barrel defining a chamber, the chamber having a first end and a second end spaced from the first end, a piston movably positioned in the chamber and a piston rod connected to the piston and extending outside of the barrel, each chamber having a first fluid port proximate the first end and a second fluid port proximate the second end, the barrel of each hydraulic cylinder connected to one of the base and the cross yoke, and each piston rod of each hydraulic cylinder connected to the other of the base and the cross yoke;
  a fluid reservoir containing a fluid;
  a fluid supply circuit in fluid communication with the fluid reservoir and the first fluid ports and second fluid ports of the first and second hydraulic cylinders, the fluid supply circuit including:
    a first variable position control valve positioned between the fluid reservoir and the first and second fluid ports of the first and second hydraulic cylinders to control a flow of fluid in and out of the first and second fluid ports;
    a second variable position control valve positioned between the fluid reservoir and the first and second fluid ports of the first and second hydraulic cylinders to control the flow of fluid in the fluid supply circuit; and
    an adjustable throttle valve in fluid communication with the first and second fluid ports of the second hydraulic cylinder to control a rate of fluid flow out of the chambers of the first and second hydraulic cylinders and thereby control a release of energy stored in the at least one biasing mechanism;
  a pump in fluid communication with the fluid reservoir and configured to circulate the fluid within the fluid supply circuit and each chamber of the first and second hydraulic cylinders;
  a first bracket associated with the base and configured to secure a first fitting;
  a second bracket associated with the cross yoke and configured to secure a second fitting, wherein the first and second fittings are configured to mate; and
  a force measuring device associated with the first bracket or second bracket and configured to measure a compression force applied to the first fitting by the second fitting,
  wherein the pump supplies fluid to the fluid supply circuit, including the chambers of the first hydraulic cylinder and the second hydraulic cylinder and wherein the first and second variable position control valves control a direction of fluid flowing with the fluid supply circuit.

2. The test apparatus of claim 1, further comprising a controller in communication with the first and second variable position control valves, the adjustable throttle valve, the force measuring device and the pump, and wherein the controller is configured to send a signal to change the position of the first and second variable position control valves, to send a signal to adjust the position of the adjustable throttle valve and to send a signal to change an operation of the pump and to receive a signal from the force measuring device relating to the force being applied by the test apparatus on the first and second fittings.

3. The testing apparatus of claim 1, further comprising an accelerometer mounted to the cross yoke and in communication with a controller, the accelerometer configured to measure the acceleration of the cross yoke relative to the base and adjust the position of the adjustable throttle valve to achieve a specified acceleration value.

4. The testing apparatus of claim 1, wherein a controller is in communication with the pump.

5. The testing apparatus of claim 1, wherein a controller is in communication with the force measuring device.

6. The testing apparatus of claim 4, wherein the force measuring device is a load cell.

7. The testing apparatus of claim 1, further comprising at least one adjustably positionable guide plate associated with at least one of the base and the cross yoke to adjust the position of the first fitting or second fitting within the first bracket or second bracket.

8. The testing apparatus of claim 1, where in the at least one biasing mechanism is a first spring set comprising a first coil spring mounted to and surrounding the first rail and a second coil spring mounted to and surrounding the second rail.

9. The testing apparatus of claim 1, wherein the first variable position control valve in a first position permits fluid from the fluid reservoir to flow into the first fluid ports of the first and second hydraulic cylinders and out of the second fluid ports of the first and second hydraulic cylinders to the fluid reservoir, in a second position permits fluid to flow from the fluid reservoir to the second fluid ports of the first and second hydraulic cylinders and out of the first fluid ports of the first and second hydraulic cylinders, and in a third position blocks fluid flowing from or to the fluid reservoir.

10. The testing apparatus of claim 1, wherein the second variable position control valve in a first position permits fluid to exit the chambers of the first and second hydraulic cylinders through the first fluid ports and enter the chambers of the first and second hydraulic cylinders through the second fluid ports, and in a second position blocks fluid flowing between the first and second fluid ports of the first and second hydraulic cylinders.

11. The testing apparatus of claim 10, wherein when the second variable position control valve is in the second position, the at least one biasing mechanism causes the cross yoke to move away from the base by releasing stored energy.

12. A method for testing a separation of a coupling, comprising:
  (a) providing a test apparatus comprising a base, a first rail and a second rail extending in the same direction from the base, a movable yoke interconnected to the first and second rail and movable toward and away from the base, a first compressible biasing mechanism positioned between the base and the yoke that opposes movement of the yoke toward the base, and at least one hydraulic cylinder having a first end and a second end, an internal chamber, a piston movable within the internal chamber and a piston rod extending from the piston through the first end of the at least one hydraulic cylinder to an exterior of the at least one hydraulic cylinder, wherein the piston rod is interconnected to one of the base and the yoke and the second end of the at least one hydraulic cylinder is interconnected to the other of the base and the yoke;
  (b) providing a first coupling comprising a first fitting and a second fitting, and interconnecting one of the first and second fittings to the base and the other of the first and second fittings to the yoke;
  (c) pressurizing the internal chamber of the at least one hydraulic cylinder with fluid to move the yoke toward the base, mate the first fitting to the second fitting and compress the first compressible biasing mechanism to store a first potential energy in the first compressible biasing mechanism; and
  (d) controllably adjusting a hydraulic pressure within the at least one hydraulic cylinder over time without an input of energy from a hydraulic pump.

13. The method of claim 12, further comprising, following controllably releasing the hydraulic pressure within the at least one hydraulic cylinder, repeating steps (c) and (d).

14. The method of claim 12, further comprising, following controllably releasing the hydraulic pressure within the at least one hydraulic cylinder, changing the position of the first fitting relative to the second fitting, and repeating steps (c) and (d).

15. The method of claim 12, wherein the test apparatus further comprises an accelerometer mounted to the yoke, and controllably releasing the hydraulic pressure within the at least one hydraulic cylinder comprises using output from the accelerometer to adjust the release of the hydraulic pressure.

16. The method of claim 12, further comprising, following controllably releasing the hydraulic pressure within the at least one hydraulic cylinder, changing the first compressible biasing mechanism to store a second potential energy different from the first potential energy upon pressurization of the at least one hydraulic cylinder.

17. The method of claim 16, further comprising changing the first compressible biasing mechanism to a second compressible biasing mechanism, and repeating steps (c) and (d).

18. The method of claim 12, further comprising, following controllably releasing the hydraulic pressure within the at least one hydraulic cylinder:
  removing the first and second fittings;
  interconnecting a third fitting to the base and interconnecting a fourth fitting to the yoke;
  pressurizing the internal chamber of the at least one hydraulic cylinder with fluid to move the yoke toward the base, mate the first fitting to the second fitting and compress the first compressible biasing mechanism to store the first potential energy in the first compressible biasing mechanism; and
  controllably releasing the hydraulic pressure within the at least one hydraulic cylinder over time.

19. The method of claim 12, wherein controllably adjusting the hydraulic pressure within the at least one hydraulic cylinder over time comprises releasing the pressure.

20. The method of claim 12, wherein controllably adjusting the hydraulic pressure within the at least one hydraulic cylinder over time comprises releasing the pressure and increasing the pressure at different times.

21. A testing apparatus for fluid fittings, comprising:
  a base;
  a cross yoke;
  at least one hydraulic cylinder defining a chamber, the chamber having a first end and a second end spaced from the first end, a piston movably positioned in the chamber and a piston rod connected to the piston, the chamber having a first fluid port proximate the first end and a second fluid port proximate the second end, the at least one hydraulic cylinder connected to one of the base and the cross yoke, and the piston rod connected to the other of the base and the cross yoke;
  at least one biasing mechanism disposed between the base and the cross yoke and configured to store energy and upon release of the energy cause separation of the cross yoke and the base;
  a fluid reservoir containing a fluid;

a fluid supply circuit in fluid communication with the fluid reservoir and the first fluid port and second fluid port of the at least one hydraulic cylinder, the fluid supply circuit including:
- a first variable position control valve positioned between the fluid reservoir and the first and second fluid ports of the at least one hydraulic cylinder to control a flow of fluid in and out of the first and second fluid ports;
- a second variable position control valve positioned between the fluid reservoir and the first and second fluid ports of the at least one hydraulic cylinder to control the flow of fluid in the fluid supply circuit; and
- an adjustable throttle valve in fluid communication with the first and second fluid ports of the at least one hydraulic cylinder to control a rate of fluid flow out of the chamber of the at least one hydraulic cylinder and thereby control the release of energy stored in the at least one biasing mechanism; and a pump in fluid communication with the fluid reservoir and configured to circulate the fluid within the fluid supply circuit and each chamber of the at least one hydraulic cylinder, wherein, in a first state, the fluid supply circuit directs the flow of fluid to move the piston and store energy in the at least one biasing mechanism, and in a second state, the fluid supply circuit controllably directs the flow of fluid to release the stored energy.

22. The testing apparatus of claim 21, wherein the at least one biasing mechanism is at least one coil spring having a hollow core, and the at least one hydraulic cylinder is disposed in the hollow core.

23. The testing apparatus of claim 21, further comprising a controller in communication with the first and second variable position control valves, the adjustable throttle valve, a force measuring device and the pump, and wherein the controller is configured to send a signal to change the position of the first and second variable position control valves, to send a signal to adjust the position of the adjustable throttle valve and to send a signal to change an operation of the pump and to receive a signal from an acceleration measuring device configured to provide acceleration of the cross yoke relative to the base.

24. The testing apparatus of claim 23, wherein the force measuring device is configured to measure a fluid pressure in the fluid supply circuit.

* * * * *